June 29, 1943. G. M. CROSS 2,323,204
VEHICLE SUSPENSION MECHANISM
Filed Jan. 12, 1940 3 Sheets-Sheet 1

Inventor.
Grosvenor M. Cross
by Heard Smith & Tennant
Attys

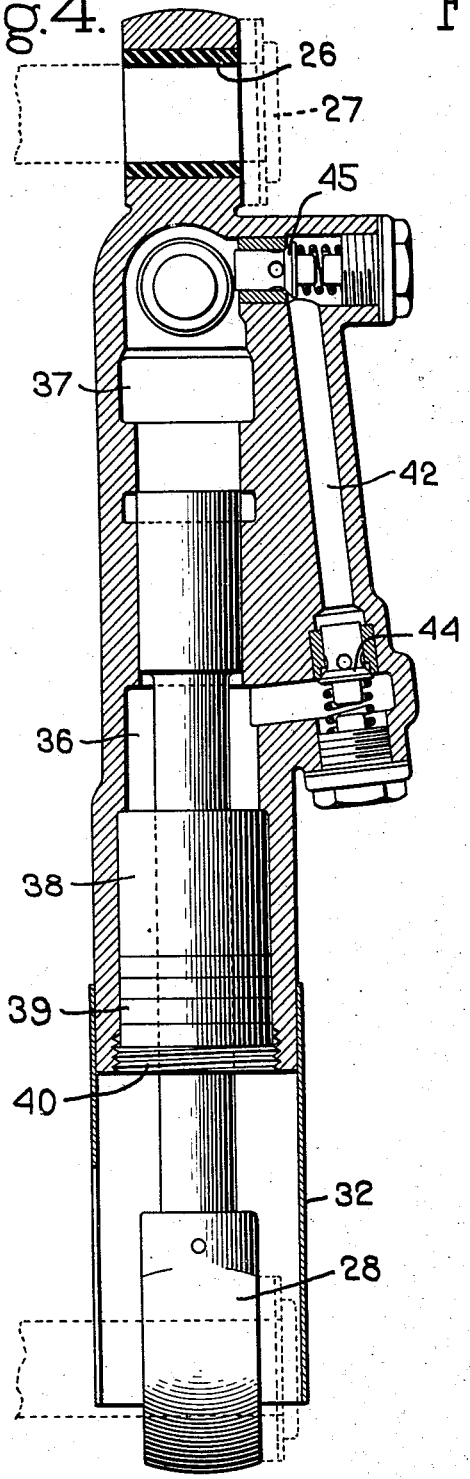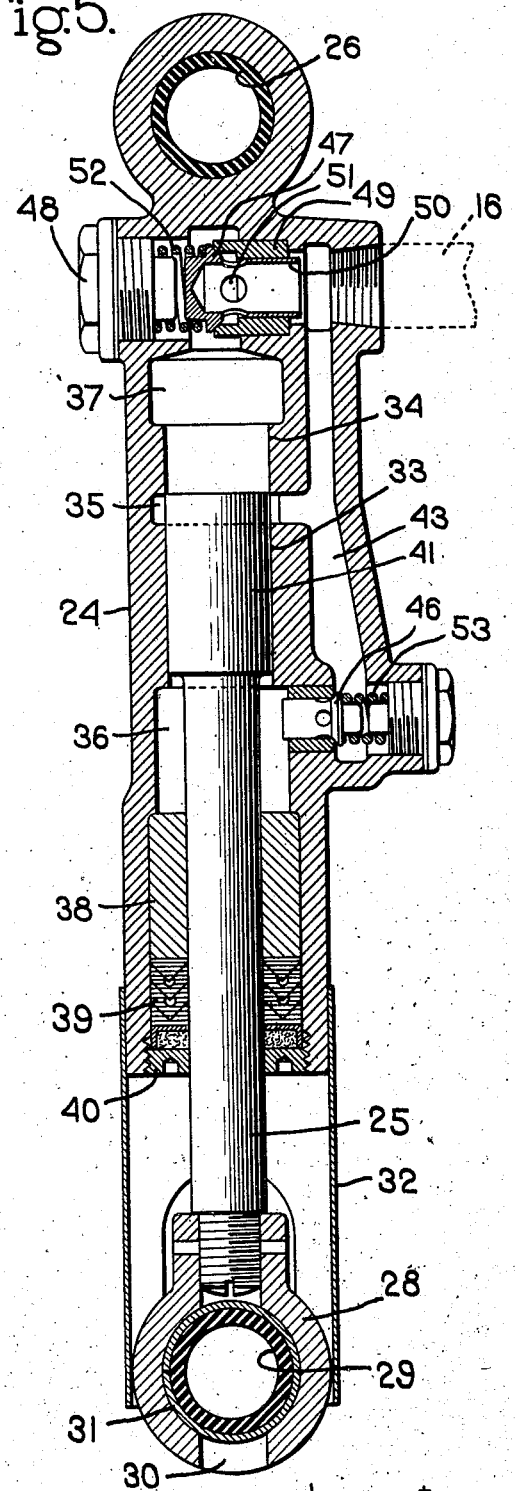

June 29, 1943.  G. M. CROSS  2,323,204
VEHICLE SUSPENSION MECHANISM
Filed Jan. 12, 1940  3 Sheets-Sheet 3
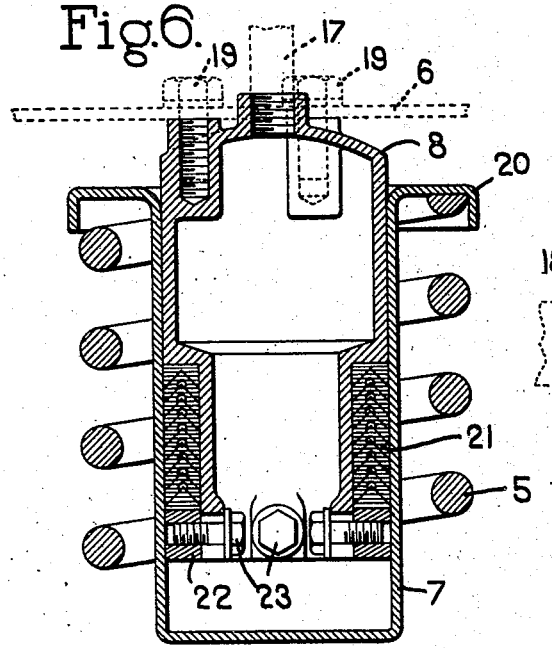
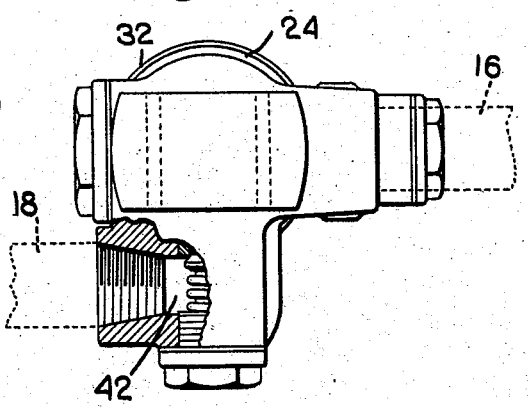
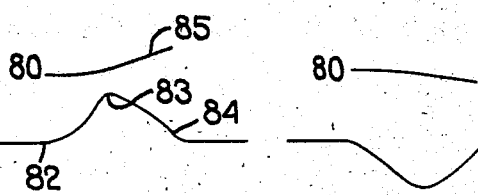
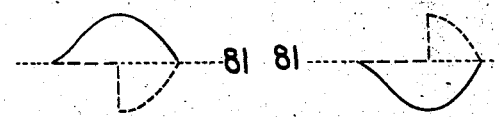
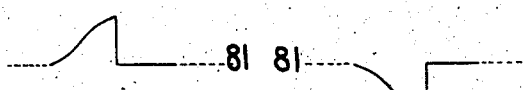
Inventor.
Grosvenor M. Cross
by Heard Smith & Tennant
Attys.

Patented June 29, 1943

2,323,204

UNITED STATES PATENT OFFICE 2,323,204

VEHICLE SUSPENSION MECHANISM

Grosvenor M. Cross, New York, N. Y.

Application January 12, 1940, Serial No. 313,540

8 Claims. (Cl. 267—15)

This invention relates to a mechanism of vehicle suspension primarily for securing the maximum riding comfort.

During the operation of a vehicle such as an automobile, the resilient means interposed between the sprung and unsprung elements of the vehicle, or, more specifically, between the body and the axle elements, undergoes constant deflection as the vehicle travels over the road and thus constantly exerts a pressure between the body and axle greater or less than that normal pressure required to sustain the weight of the body and its load with the vehicle at rest. It is well recognized that the condition of maximum riding comfort is attained by permitting free deflection of the vehicle spring in either direction away from its position of mean deflection or that deflection which exists due to the body or the body and its load when the vehicle is at rest on the level and by neutralizing the force of the spring tending further to accelerate the movement of the body with respect to the axle during the return of the spring to the position of mean deflection.

Any such neutralizing device or shock absorber must, however, operate about a normal point mechanically determined, but, since the distance between the body and the axle and also the position of the spring at mean deflection changes with each change in the load, there is no definite relationship between the normal or mid position of the neutralizing device and the position of the elements the control of which it has for its essential object. While a slight variation in this relationship may not be seriously objectionable for certain applications as when load changes on the vehicle body are slight or, for example, at the front suspension in many automobiles where the change of load is slight, it has generally been incapable of establishment because of the relatively large changes in load which constantly take place even in the ordinary automobile. Consequently the shock absorber or neutralizing device is impossible of producing its proper results except under very limited conditions.

The present invention has for one of its objects to approximate at all times an invariable mean distance between the body and the axle of the vehicle regardless of the load, thus rendering it possible to secure and maintain a definite relationship between the operation of the shock absorber or neutralizer and the elements controlled by it so that the control thus effected is always uniform.

Since a vehicle does not travel over a theoretically smooth surface, some relative movement between the body and the axle is constantly taking place and the invention has as its further object to utilize this relative oscillation between the body and the axle to effect the operation of means acting to approximate an invariable mean distance between the body and the axle regardless of the load upon the body. Thus it is possible during the travel of the vehicle to secure a predetermined mean distance between the body and the axle at all times regardless of the load.

Since, then, with this invention the distance between the body and the axle remains approximately constant regardless of the load, the neutralizer or shock absorber will have its normal or mid position invariable while functioning regardless of the load upon the body and will thus act precisely the same regardless of the load during the movement of the vehicle.

The distance between the body and the axle is primarily determined by the range required for the functioning of the spring. Part of the function of the spring is to provide the resiliency required for riding comfort and part is to offset the change taking place in the load. With the present invention, if that function of the spring provided for riding comfort remains the same, the range required for offsetting the change in load may be eliminated, thus reducing the distance required between the body and the axle with a minimum load. If, however, it is desired to increase the resiliency of the spring for greater riding comfort, this may be done with the present invention by utilizing the entire range of the spring for that purpose without increasing the normal distance between the body and axle. In the former case the advantages are obtained of enabling the vehicle to be constructed with a lower floor height than at present and with a more aesthetic design as well as less exigent design of the mechanical parts. Thus the center of gravity of the entire vehicle may be lowered and other desirable details of construction and operation improved, as, for example, rendering it possible to focus the headlights properly since the beams will not be raised off the road by heavy loading of the rear of the vehicle.

The drawings illustrate a simple and preferred form of construction embodying the principles of the invention.

In the drawings:

Figs. 4 and 5 are views chiefly in longitudinal cross section of the load-adjusting pumping element illustrated as a preferred embodiment of one feature of the invention, the sections being taken at right angles to each other.

Fig. 6 is a view chiefly in vertical cross section of the upper portion of a spring and spring extension mechanism connected to the vehicle body employed as illustrating a feature of the invention.

Fig. 7 is a top plan view of the construction shown in Figs. 4 and 5.

Figs. 8 to 14, inclusive, are diagrammatic representations illustrating movements and forces involved and compared.

The broad principles of the invention are particularly applicable to the operation of a vehicle such as an automobile involving sprung and unsprung elements, the unsprung elements being those moved in general with the wheels and the sprung being those associated with the body. The term "axle" is herein employed as defining the unsprung element of the vehicle, and the term "body" as defining the sprung element. The body may be yieldingly supported by any suitable means from the axle and for that purpose the terms "resilient means" and "spring" are here employed in a generic sense. For convenience of illustration a coiled helical spring is shown as a suitable and commonly used resilient supporting means and may represent the main or auxiliary supporting element. In the former case, it would probably be designed to carry the total weight of the body and load and, in the latter case, to carry with the main spring element a portion thereof varying with the change in load. It will be understood that the elements involving the invention herein illustrated and described are desirably duplicated at the sides of the vehicle. So also, since the variation in load in the type of vehicle illustrated takes place chiefly at the rear end and the undesirable conditions which the invention overcomes occur chiefly at the rear end, the embodiment of the invention is only illustrated in connection therewith.

The load supported by the resilient means comprises that portion of the weight of the body opposed thereto and any additional load applied to the body, the former being a fixed element and the latter varying within wide limits.

Figure 1:
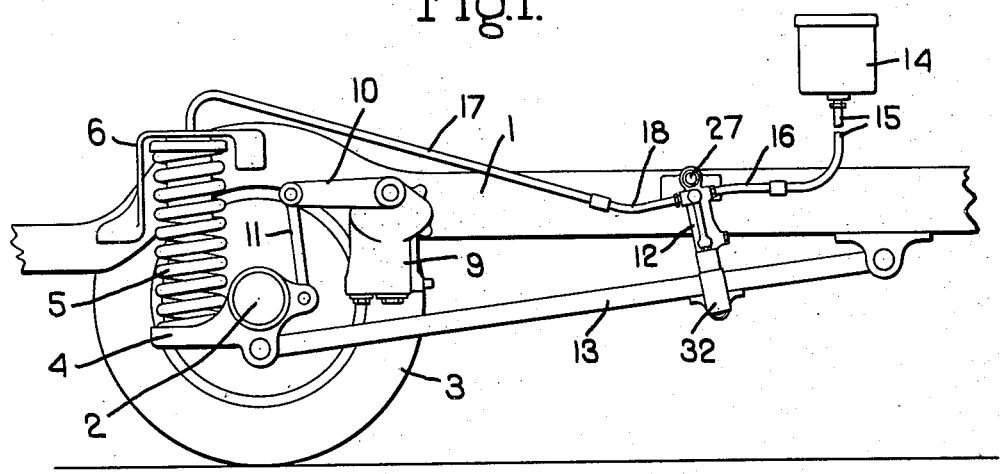
Fig. 1 is a schematic view of a portion of a vehicle sufficient to illustrate an application of the invention, together with a preferred form of construction of the invention embodied therein.

In the somewhat schematic or diagrammatic illustration of Fig. 1, the vehicle body is represented by the frame 1 while the axle 2 carries the usual wheel 3. A saddle member 4 rigid with the axle 2 supports the lower end of a helical spring 5. Between the upper end of the spring 5 and a bracket 6 rigid with the frame 1 is mounted an extension of the spring formed by a cylinder 7 and cooperating piston 8 shown in detail in Fig. 6.

Figure 2:
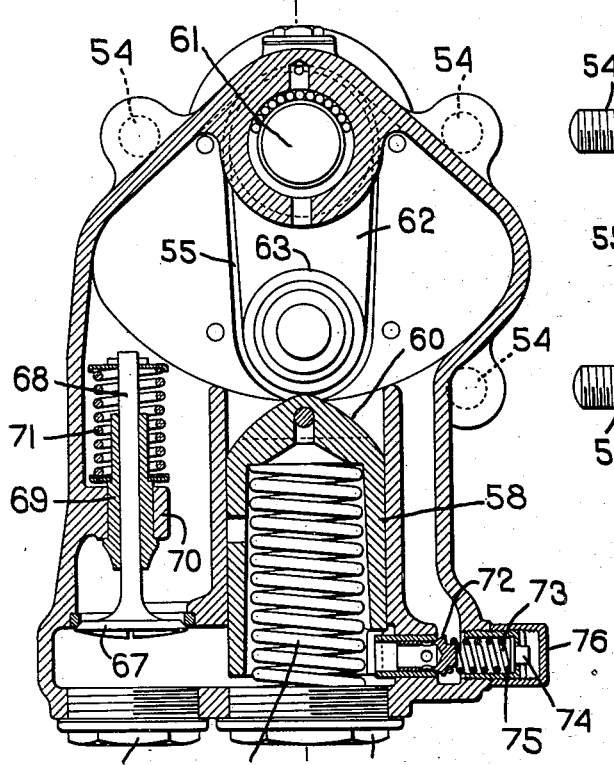
Fig. 2 is a view chiefly in vertical cross section taken on the line 2—2 of Fig. 3 of a construction of the shock absorber or neutralizer illustrated in connection with the invention and involving certain novel features.
Figure 3:
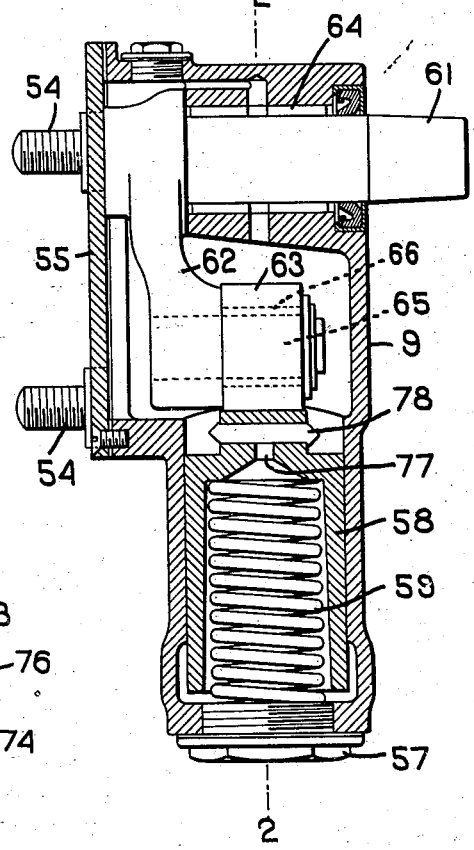
Fig. 3 is a view chiefly in vertical cross section taken on the line 3—3 of the construction shown in Fig. 2.

A suitable shock absorber or neutralizer is shown with the body portion 9 rigidly mounted on the frame 1 and provided with a pivoted arm 10 connected by a link 11 to the saddle member 4. Any suitable device may be employed for this purpose but there is illustrated a preferred type embodying novel features, the details of which are shown in Figs. 2 and 3.

In the illustrated and preferred embodiment of the invention, the load-adjusting means is of the hydraulic type operating by a pumping action from the movement which takes place between the sprung and unsprung elements of the vehicle as it travels over the roadway. The main or pumping element is indicated generally at 12 in Fig. 1 pivotally connected at its upper end to the frame 1 and at its lower end to the usual radius rod 13 shown connecting the frame to the saddle member 4. A suitable fluid such as oil is contained in a reservoir 14 mounted at some suitable position on the vehicle body and a pipe 15 having a flexible element 16 leads therefrom to the element 12 and a pipe 17 having a flexible element 18 leads from this element to the interior of the cylinder 7.

In the type of resilient means illustrated for supporting the body from the axle, there is illustrated the helical spring 5 and an extension thereof formed by the cooperating cylinder and piston. One end of this composite member is connected to the body and one to the axle. As illustrated, the lower end of the spring is connected to the axle by seating upon the saddle 4, while the piston 8 is rigidly secured by bolts 19 to the bracket 6 on the body. Referring to Fig. 6, the cylinder 7 is shown as closed at its lower end, open at its upper end, and provided with an annular flange 20 against which the upper end of the spring 5 seats. The piston 8 is shown as hollow, closed at its upper end and open at its lower end, and having a tight sliding fit in the cylinder. A suitable packing 21 surrounds the reduced lower portion of the piston and is held in position by a ring 22 secured by bolts 23 to the piston wall. The fluid pipe 17 is screwed into the upper end of the piston so that fluid forced therein and withdrawn therefrom, together with the movement of the body under its load and the force of the spring, controls the degree of separation between the body and the axle. Thus it will be seen that fluid forced through the pipe 17 into the piston acting against the closed bottom of the cylinder 7 will force the cylinder downward, and similarly, when fluid is withdrawn in the opposite direction, the cylinder 7 impelled by the force of the spring 5 will rise toward the body. Thus the body will be raised or lowered above the upper end of the spring 5.

The mechanism here employed acts automatically to pump fluid into or withdraw it from the piston and thus insure such lowering or raising of the body when the load on the body is increased or diminished and this is effected in such a manner as to insure that the body, regardless of the load, shall maintain an approximately invariable mean distance of separation from the axle during the travel of the vehicle.

The preferred mechanism employed for controlling the flow of fluid to and from the piston is illustrated in Figs. 4 and 5. This device is shown as comprising a generally cylindrical body 24 and cooperating piston element 25. One of these members, as pointed one, is pivotally connected to the body or sprung element and the other to the axle or unsprung element and for the latter purpose is shown connected to the radius rod 13. As illustrated, the body 24 is provided at its upper end with a bore having a rubber bushing 26 fitting over a suitable stud 27 on the frame 1 and the piston element 25 has screwed to the lower end of its stem an eye 28 having a bore also provided with a rubber bushing 29 fitting over a stud on the radius rod. A hole 30 is shown in the lower end of the eye 28 to enable a screw driver to be passed through the eye and engage the lower end of the stem of the piston element and a steel ring 31 is thereafter positioned between the bushing 29 and the eye to prevent the bushing from bulging into the hole 30. A cylindrical splash cover 32 fits over the lower end of the body 24 and extends down over the eye 28.

The central portion of the body 24 is bored to the same diameter forming the cylindrical surfaces 33 and 34 and these surfaces are separated by an annular enlarged interspace 35 and further relieved at the ends by the cored chambers 36 and 37. At its lower end the body is bored to receive a bushing 38 and a packing assembly 39 backing up the bushing and held in place by the ring 40 screwed into the body.

The piston element presents the piston proper 41 which has a close sliding fit against the cylindrical surfaces 33 and 34 and thus separates the chambers 36 and 37. The stem or piston rod 25 has a cross section area half that of the piston 41.

Within the body 24 and extending laterally of the cylinders of the chambers 36 and 37 are provided the chambers 42 and 43. The fluid pipe 16 opens into the chamber 43 and the fluid pipe 18 opens into the chamber 42. The chamber 42 communicates at its upper end with the chamber 37 and at its lower end with the chamber 36 by means of the valve assemblies illustrated. A valve 44 permits flow from chamber 42 to chamber 36 but prevents flow in the opposite direction, while the valve 45 permits flow from the chamber 37 to the chamber 42 and prevents flow in the opposite direction. In a similar but opposite manner the chamber 43 communicates at its upper end with the chamber 37 and at its lower end with the chamber 36 by means of similar valve assemblies illustrated. The valve 46 permits flow from the chamber 36 to the chamber 43, while preventing flow in the opposite direction, and the valve 47 permits flow from the chamber 43 to the chamber 37, while preventing flow in the opposite direction.

The four valve assemblies illustrated may be of any suitable construction to secure the required operation but are conveniently illustrated as all of the same type but different in size as required by the differences of pressure and velocity operating at the particular points. It will be sufficient to describe the assembly at the upper end of the chamber 43. The body is bored in opposite the bore for the pipe 16 and closed by a screw-threaded plug 48. In the bore opposite the end of the pipe 16 is inserted a hardened steel bushing 49. The valve 47 seats against this bushing and is provided with a hollow stem 50 having a loose fit in the bushing and is provided with suitable openings 51 to permit the free passage of the fluid when the valve opens. The valve 47 is held against its seat by the spring 52 seated against the plug 48. By varying the power of the spring, the pressure acting to close the valve is readily controlled.

The construction thus described constitutes in effect a double pumping device. As the piston 41 reciprocates, the volumes of the chambers 36 and 37 change, effecting, as that of chamber 36 diminishes, flow of the fluid therefrom into the chamber 43 and, as it increases, flow thereinto from the chamber 42. Similarly, as the volume of the chamber 37 increases, flow takes place thereinto from the chamber 43 and, as it diminishes, therefrom into the chamber 42.

The interspace 35 opens into the chamber 43 so that when the upper edge of the piston 41 is below the cylindrical surface 34, the chambers 37 and 43 are in communication. The piston is shown in Figs. 4 and 5 at what may be termed its mid or normal mean position or the position at which any downward movement therefrom of the piston effects communication between the chambers 37 and 43. It will therefore be seen that as relative reciprocation takes place between the piston and body elements of the device, the piston under all conditions is pumping fluid from the chamber 42, past the valve 44, through the chamber 36, past the valve 46, and into the chamber 43; while if the upper end of the piston is reciprocating above the mid position illustrated, fluid is being pumped from the chamber 43 past the valve 47, into the chamber 37 and past the valve 45 into the chamber 42. But if the upper end of the piston in its reciprocation works below the mid position illustrated, then since the chamber 37 is in communication through the interspace 35 and the chamber 43 with the reservoir, no pumping action takes place at the upper end. The effective piston area cooperating with the chamber 36 is half the piston area cooperating with the chamber 37, as already noted, and consequently for a given stroke of the piston the fluid is pumped through the chamber 37 in twice the amount as through the chamber 36. Therefore, since the fluid is always being pumped through the chamber 36 but is only pumped through the chamber 37 when the piston works above its mid position, it will be seen that with the same piston stroke an equal amount of fluid will be pumped from the reservoir through the piston 8 into the cylinder 7 of the spring extension device shown in Fig. 6 during the stroke above the normal or mid position shown as is withdrawn from the cylinder 7 when the piston is operating below the said position. Obviously the relative effective piston areas may be varied somewhat if found desirable.

In order that the quantity of fluid pumped out of the cylinder 7 may be entirely controlled by the movement of the piston 41, the spring 53 must be sufficiently powerful to maintain a back pressure greater than any pressure in the cylinder 7 resulting from the deflection of the spring 5.

The shock absorber or neutralizer device shown in Figs. 2 and 3 comprises the chambered body 9 provided with suitable studs 54 by means of which it is bolted to the vehicle frame. The upper portion of the body is closed by a removable back plate 55 and at the bottom is bored out and closed by screw-threaded plugs 56 and 57, thus enabling the working parts readily to be assembled. The shock absorber works on generally well-known principles. The piston element 58 is hollow, backed up by a spring 59 seated against the plug 57 and carries directly upon its upper face the operating cam 60. The arm 10 is secured to the rock shaft 61 having the depending arm 62 on which is journalled the roller 63 cooperating with the cam 60. The shaft 61 is mounted in a roller or needle bearing 64 in the upper end of the body and the roller 63 is similarly mounted on the stud 65 projecting from the arm 62 by means of the roller bearing 66.

The large inlet valve 67 has its stem 68 mounted in a bushing 69 in a flange 70 of the body arranged opposite the plug 56 and this valve is held against its seat by the spring 71. The outlet valve 72 is shown as part of a valve assembly similar to the valve assemblies shown in Figs. 4 and 5. The spring 73 of this valve conveniently abuts against the head of a stud 74 fitting in and projecting from the sleeve 75 threaded into the body. Thus by removing the covering cap 76, the pressure exerted by the spring may be determined by placing a gauge against the end of the stud 74 and adjusted by screwing the sleeve 75 and then locked in position by screwing the cap 76 in place on the sleeve. The trapping of air within the hollow piston is prevented by an aperture extending transversely through the end of the piston communicating at 77 with the piston interior and closed by a loosely fitting pin 78.

The elements of the neutralizing device are shown in normal or mid position. The surface of the cam 60 which cooperates with the roller 63 is accurately designed in accordance with well-known principles to effect during return to its mid position after deflection therefrom in either direction the neutralization of the force of the resilient means or spring which tends to accelerate the movement of the body.

Thus, in the construction illustrated, the shaft 61 may rotate freely in either direction away from the mid position illustrated and thereupon the piston 58 will be forced upward by the spring 59 drawing the fluid freely past the inlet 67. The opposite rotation of the shaft to return the parts to mid position will be opposed by the fluid pressure acting on the piston interior and transmitted to the roller 63 through the cam 60, the spring-governed valve 72 controlling the pressure of the fluid.

Graphically the action of this neutralizer is illustrated in Fig. 8 for a spring compression such as might result from a short rise in the road and in Fig. 9 from a depression in the road. In these figures the line 79 represents the path of movement of the axle and the line 80 the path of movement of the body. Figs. 10 and 11 are graphs corresponding respectively to Figs. 8 and 9 illustrating the change in the forces of the spring and the neutralizer which takes place with the correlation of the present invention. Figs. 12 and 13 respectively illustrate the net of the forces exerted between the body and axle. The base line 81 in Figs. 10 to 13, inclusive, represents the force exerted by the spring when at mean deflection.

Between the points 82 and 83 the spring is undergoing its initial deflection, the neutralizer exerts no force and free vertical acceleration is imparted to the body which is necessary in order that the body shall follow the general course of the road and that, when road irregularities are greater in amplitude than the movement of the spring, the axle may not strike the body. At the point 83 the deflection of the spring has done its work and further acceleration of the body would be unnecessary and harmful and at this point where the body and axle start to separate, the neutralizer should come into action and deliver the counteracting force in accordance with the principles already described. The result is a net force acting between the body and axle between the points 83 and 84 precisely equal to the force exerted by the spring when at mean deflection. Consequently all acceleration of the body during the movement from point 83 to point 84 is eliminated and the path of the body becomes a straight line 85 which is the optimum condition for comfort with any spring suspension. Similar conditions occur when the vehicle meets a depression, as illustrated in Fig. 9.

The optimum conditions thus described and graphically illustrated are only obtained by the present invention in which the action of the shock absorber or neutralizer is correlated with the means for maintaining an approximately constant degree of separation between the body and axle regardless of the load, thereby maintaining a constant fixed relation between this invariable mean degree of separation and the normal or mid position of the neutralizer.

The advantages of the invention and the serious objections overcome by the use of the invention are graphically illustrated in Fig. 14, wherein the irregular line 86 represents an irregular roadway and the line 87 the path of travel of the body when under perfect control with this invention. The line 88 represents the path of movement of the body unloaded or with a light load over the same roadway when the mean separation of the body and axle is greatly increased as the result of the light load so that the proper relation between the action of the neutralizer and the elements to be controlled is destroyed. In a similar manner the line 89 represents the path of movement of the body when a heavy load is applied to the body and when likewise, owing to the reduction in the mean degree of separation between the body and the axle, the relationship is again destroyed. That is, both of the lines 88 and 89 represent a path of movement of the body where the principle of the invention has not been employed and wherein the degree of separation between the body and axle varies with the load. It is to be understood, of course, that this diagram is illustrative merely, but it does directly illustrate the principles here involved when the neutralizer exerts its force in the wrong relation with the force exerted by the spring, as necessarily occurs when it is not properly correlated with an invariable mean degree of separation of the body and axle.

The operation of the mechanism already described in maintaining or closely approximating the invariable mean degree of separation between the body and axle, regardless of the load, will be clear. When a load is applied to the body or the load on the body is increased, the first result is the compression of the spring element 5 and, as the body and axle move together, the piston 41 is forced above the mid position illustrated. Consequently, as the vehicle moves and oscillation takes place between the body and axle, fluid is pumped from the reservoir into the cylinder 7, raising the piston 8 and thereby separating the body and axle until the predetermined mean degree of separation is effected and the mean position of the piston 41 has been returned to that illustrated in Figs. 4 and 5, and as long as it remains in this position, an equal amount of fluid is pumped into and out of the cylinder 7, thus maintaining the predetermined mean degree of separation of the body and axle. Similarly, when the load is diminished, the first result is a tendency for the body and axle to separate and consequently for the mean position of the piston 41 to be lowered, resulting in the fluid being pumped from the cylinder 7 back to the reservoir, thus again restoring the predetermined mean degree of separation between the body and axle.

Having thus described the invention, what is claimed as new, and desired to be secured by Letters Patent, is:

1. In a vehicle, an axle, a body, means including a resilient element supporting the body from the axle, means operated by relative oscillatory movement of the body and axle acting during movement of the vehicle over an irregular surface to approximate an invariable mean distance between the body and axle regardless of the load within the capacity of the body, and a shock absorber acting to permit free deflection of the resilient means in either direction from its position at mean deflection for any load and to exert during the return of the resilient means to said mean deflection a force sufficient to neutralize the force of the resilient means tending further to accelerate the movement of the body with respect to the axle.

2. In a vehicle, an axle, a body, means including a spring acting to support the unloaded body at a predetermined distance from the axle, means operated by relative oscillatory movement of the body and axle acting during movement of the vehicle over an irregular surface to compress the spring by an amount proportionate to the force opposed to the spring by the body and any load placed upon the body within its capacity and thereby to approximate an invariable mean distance between the body and axle regardless of the load, and a shock absorber acting to permit free deflection of the spring in either direction from its position at mean deflection for any load and to exert during the return of the resilient means to said mean deflection a force sufficient to neutralize the force of the resilient means tending further to accelerate the movement of the body with respect to the axle.

3. In a vehicle, a body, an axle, a spring, a spring extension, means connecting the spring and the extension the one to the body and the other to the axle to cause the said elements to support the body yieldingly from the axle with the extension movable with respect to the spring to control the distance between the body and axle, means operated by movement of the vehicle imparted to it in passing over an irregular surface acting to effect relative movement between the extension and the spring to maintain the said distance at a constant mean regardless of any change in the load within the capacity of the body, and a shock absorber acting to permit free deflection of the spring in either direction from its position at mean deflection for any load and to exert during the return of the resilient means to said mean deflection a force sufficient to neutralize the force of the resilient means tending further to accelerate the movement of the body with respect to the axle.

4. In a vehicle, an axle, a body, resilient means supporting the body from the axle, a fluid pumping device comprising a chambered body and a piston reciprocable therein at varying mean positions acting when operating above a predetermined mean position to pump fluid in one direction and when operating below said predetermined mean position to pump the fluid in the opposite direction, and means operated by relative oscillatory movement of the body and axle to effect the reciprocation of the piston.

5. In a vehicle, an axle, a body, a fluid pumping device comprising a chambered body and a piston reciprocable therein at varying mean positions acting when operating above a predetermined mean position to pump fluid in one direction and when operating below said predetermined mean position to pump the fluid in the opposite direction, and means operated by movement of the vehicle to effect reciprocation of the piston with change in the mean degree of separation between the body and axle acting proportionately to shift the mean position of the piston.

6. In a vehicle, a body, an axle, and means for determining the degree of separation between the body and axle including a reversing reciprocating pump having a piston and cylinder and having a discharge rate proportional to the length of a variable piston stroke and a discharge direction determined by the position of the piston in the cylinder.

7. In a vehicle, an axle, a body, means including a resilient element supporting the body from the axle, means operated by relative oscillatory movement of the body and axle acting during movement of the vehicle over an irregular surface to approximate an invariable mean distance between the body and axle regardless of the load within the capacity of the body, and a shock absorber acting to permit deflection of the resilient means in either direction from its position at mean deflection for any load and to exert a force acting to oppose the force of the resilient means tending further to accelerate the movement of the body with respect to the axle caused by the said deflection of the resilient means from its position at mean deflection.

8. In a vehicle, a body, an axle, a spring, a spring extension, means connecting the spring and the extension the one to the body and the other to the axle to cause the said elements to support the body yieldingly from the axle with the extension movable with respect to the spring to control the distance between the body and axle, means operated by movement of the vehicle imparted to it in passing over an irregular surface acting to effect relative movement between the extension and the spring to maintain the said distance at a constant mean regardless of any change in the load within the capacity of the body, and a shock absorber acting to permit deflection of the spring in either direction from its position at mean deflection for any load and to exert a force acting to oppose the force of the resilient means tending further to accelerate the movement of the body with respect to the axle caused by the said deflection of the resilient means from its position at mean deflection.

GROSVENOR M. CROSS.